(12) United States Patent
Yamazaki et al.

(10) Patent No.: US 6,502,487 B2
(45) Date of Patent: *Jan. 7, 2003

(54) METHOD OF MACHINING WORKPIECE WITH COMPLEX TOOL

(75) Inventors: Tsunehiko Yamazaki, Aichi-ken (JP);
Naoe Fukumura, Aichi-ken (JP);
Masayoshi Mizukado, Gifu-ken (JP);
Kazuhiro Kikata, Gifu-ken (JP);
Sadami Miyazaki, Aichi-ken (JP);
Koichi Maki, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/888,293

(22) Filed: Jun. 22, 2001

(65) Prior Publication Data

US 2002/0014138 A1 Feb. 7, 2002

(30) Foreign Application Priority Data

Jun. 23, 2000 (JP) ........................................ 2000-189407
Apr. 18, 2001 (JP) ........................................ 2001-119292

(51) Int. Cl.[7] .................................................. B23B 3/00
(52) U.S. Cl. ............................ 82/1.11; 82/118; 407/31; 407/34; 407/55; 29/27 C; 29/27 R
(58) Field of Search .................. 82/1.11, 118; 29/27 R, 29/27 C, 26 A, 566; 407/31, 34, 55, 131

(56) References Cited

U.S. PATENT DOCUMENTS

| 4,733,995 A | * | 3/1988 | Aebi ........................... 407/34 |
| 4,843,928 A | * | 7/1989 | Wale et al. .................... 82/131 |
| 4,949,444 A | * | 8/1990 | Kojima et al. |
| 5,191,817 A | * | 3/1993 | Mitsukuchi et al. ......... 82/1.11 |
| 6,073,524 A | * | 6/2000 | Weiss et al. .................. 82/1.11 |
| 2002/0029661 A1 | * | 3/2002 | Yamazaki et al. |

FOREIGN PATENT DOCUMENTS

| DE | 35 29 481 | 2/1987 | ........... B23Q/3/155 |
| DE | 37 33 298 | 4/1989 | ........... B23B/27/16 |

* cited by examiner

*Primary Examiner*—Derris H. Banks
*Assistant Examiner*—Ali Abdelwahed
(74) *Attorney, Agent, or Firm*—Duane Morris LLP (57) ABSTRACT

A method of machining a workpiece uses a complex tool having a number of inserts. The tool is installed on a tool holder of a machine tool and used for a turning machining operation on a workpiece, including rotating the workpiece, and selectively using one or more of the inserts on the complex tool, with the complex tool being fixed and held. A milling machining operation is performed on a workpiece using one or more of the inserts, with the complex tool being rotated and driven. Both turning machining and milling machining operations can be performed without changing tools. Extremely efficient machining is possible.

8 Claims, 12 Drawing Sheets

④ INSIDE DIAMETER ROUGH
B-AXIS ANGLE: 20°
INDEXING NUMBER 2

23

③ OUTSIDE DIAMETER FINISHING
B-AXIS ANGLE: 112°
INDEXING NUMBER 4

26

② OUTSIDE DIAMETER ROUGH
B-AXIS ANGLE: 112°
INDEXING NUMBER 3

25

① TURNING DRILL
B-AXIS ANGLE: 0°
INDEXING NUMBER 1

22

⑦ END MILL
B-AXIS ANGLE: 90°
INDEXING NUMBER 1

22

⑥ MILL DRILL
B-AXIS ANGLE: 90°
INDEXING NUMBER 1

22

⑤ INSIDE DIAMETER FINISHING
B-AXIS ANGLE: 0°
INDEXING NUMBER 4

| TOOL NUMBER 1 | | | | |
|---|---|---|---|---|
| INDEXING NUMBER | NORMAL LIFETIME | USED TIME | AVAILABLE NUMBER | USED NUMBER |
| 1 | 30 | 10 | 0 | 0 |
| 2 | 50 | 20 | 37 | 10 |
| 3 | 40 | 35 | 0 | 0 |
| 4 | 20 | 5 | 21 | 4 |

METHOD OF MACHINING WORKPIECE WITH COMPLEX TOOL

BACKGROUND OF THE INVENTION

This invention relates to method of machining workpiece with complex tool, having a plurality of inserts on a single holder portion, capable of performing various kinds of machining with one tool by selectively using these inserts.

The proposal in recent years is that the complex tool installing a plurality of inserts on a single tool is used, and these inserts are selectively used for machining on a workpiece such that the trouble of exchange of tool is omitted and the machining efficiency is improved.

But, future development as to how to perform various kinds of machining making use of such complex tool is waited.

The object of the present invention is to provide method of machining workpiece with complex tool, capable of performing various kinds of machining by effectively using the complex tool installing a plurality of inserts thereon, taking the above-mentioned circumstances into consideration.

SUMMARY OF THE INVENTION

The invention of claim 1 is method of machining workpiece with complex tool, in which a complex tool having a plurality of inserts thereon is installed on tool holding means of a machine tool so as to machine workpiece; said method comprising:

selectively using one or more inserts of a plurality of said inserts installed on said complex tool so as to perform turning machining on rotating workpiece with said complex tool being fixed and held; and using one or more inserts of a plurality of said inserts installed on said complex tool so as to perform milling machining on said workpiece with said complex tool being rotated and driven.

According to the invention of claim 1, both turning machining and milling machining can be performed with the complex tool being installed on the tool holding means, without changing tools. Then, extremely efficient machining is possible.

The invention of claim 2 is the method of machining workpiece with complex tool, wherein said turning machining and milling machining is executed without attaching and detaching said complex tool on and from said tool holding means of said machine tool.

According to the invention of claim 2, both turning machining and milling machining is performed without attaching and detaching the complex tool on and from the tool holding means. Then, no time for changing tools is necessary, and efficient machining is possible.

The invention of claim 3 is the method of machining workpiece the complex tool, wherein said milling machining is executed simultaneously using two or more inserts of a plurality of said inserts installed on said complex tool.

According to the invention of claim 3, machining having high efficiency of cutting is possible by simultaneously using two or more inserts for milling machining.

The invention of claim 4 is the method of machining workpiece with complex tool, wherein said insert is attachably and detachably installed on a main body of said complex tool.

According to the invention of claim 4, the insert is attachably and detachably installed on the main body of the complex tool. Even if one insert reaches expiration of lifetime, this insert only can be changed, so it is extremely economy.

The invention of claim 5 is the method of machining workpiece with complex tool, wherein said complex tool is positioned with respect to a workpiece, changing the position of said complex tool with respect to said workpiece, and a predetermined machining is executed in a plurality of positions on said workpiece, without attaching and detaching said complex tool on and from said tool holding means.

According to the invention of claim 5, the complex tool is positioned with respect to the workpiece, changing the position of the complex tool with respect to the workpiece, without attaching and detaching the complex tool on and from the tool holding means so as to perform a predetermined machining at a plurality of positions on the workpiece. Then, machining on various portions of a workpiece is possible.

The invention of claim 6 is the method of machining workpiece with complex tool as set forth in claim 3, wherein a plurality of said inserts to be used for said milling machining is the inserts installed on the positions having phase shift of 180° with respect to each other.

According to the invention of claim 6, a plurality of inserts to be used for milling machining is installed on the position having phase shift of 180° with respect to each other. Then, the balance of cutting force acting on machining is good so as to contribute to the improvement of machining accuracy.

The invention of claim 7 is the method of machining workpiece with complex tool, wherein a plurality of said complex tools is prepared and these complex tools are selectively installed on said tool holding means so as to machine on a workpiece with said these plurality of complex tools.

According to the invention of claim 7, a plurality of complex tools is prepared. So, the complex tool which reaches expiration of lifetime is taken out of the tool holding means, and the machining with spare complex tool is made possible during changing the insert. Therefore, machining is not interrupted, and it is convenient.

The invention of claim 8 is the method of machining workpiece with complex tool, wherein at least one insert of said inserts installed on said complex tool is used for both turning machining and milling machining.

According to the invention of claim 8, the inserts are used for both turning machining and milling machining. Then, various machining with small numbers of inserts is possible.

BRIEF DESCRIPTION OF THE DRAWINGS

FIGS. 3(a–c) is a typical view for explaining an example of tool data stored in tool file and its contents;

FIG. 10 is an example of machining with the complex tool, (a) is a view for showing an example of turning and (b) is a view for showing an example of milling.

DESCRIPTION OF THE PREFERRED EMBODIMENTS

Figure 1:
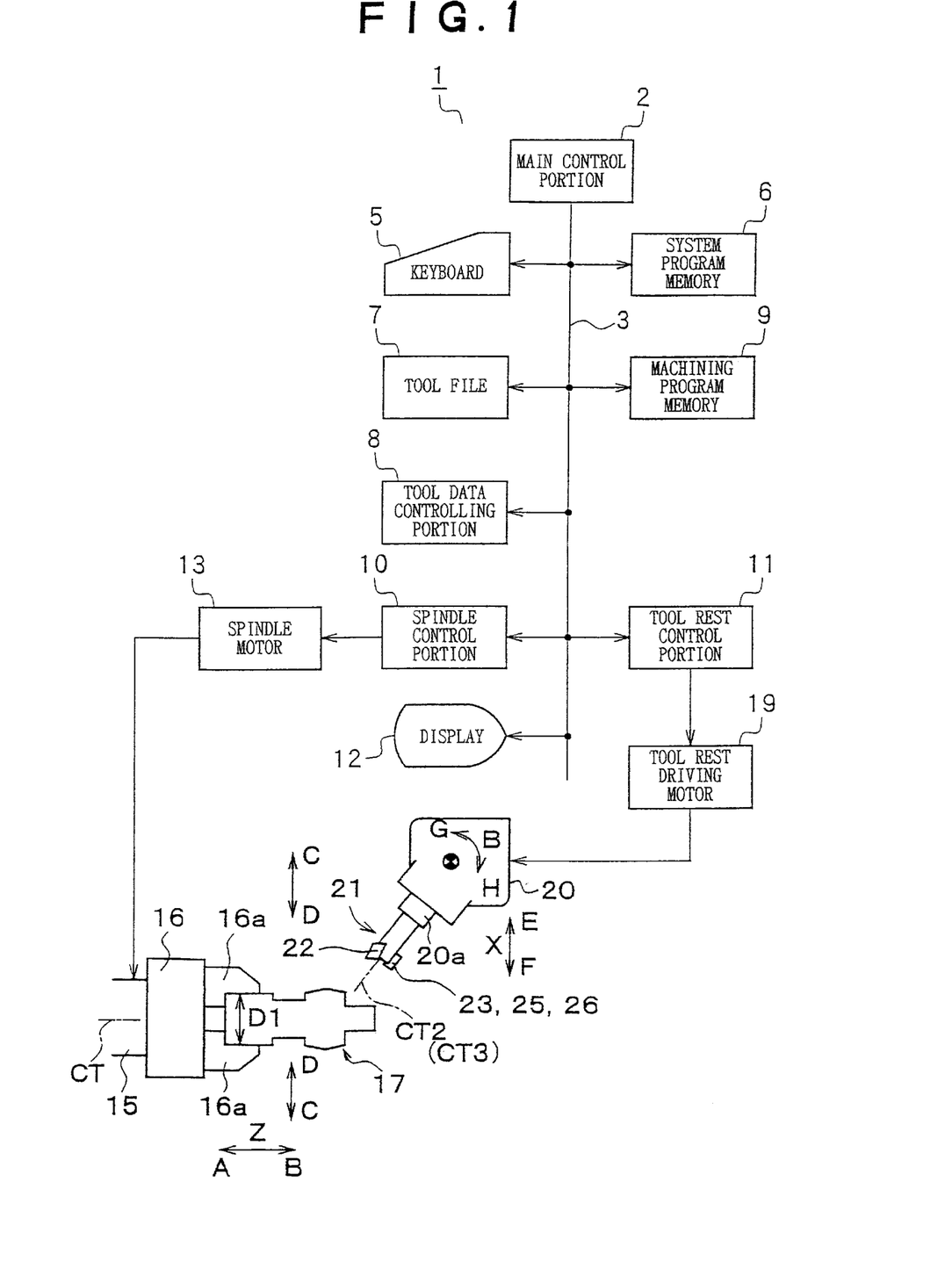
FIG. 1 is a control block diagram showing an example of a complex machining machine tool to which the present invention is applied.

A complex machining machine tool 1 has a main control portion 2, as shown in FIG. 1. With the main control portion 2, an input portion, such as a keyboard 5, a system program memory 6, a tool file 7, a tool data controlling portion 8, a machining program memory 9, a spindle control portion 10, a tool rest control portion 11 and a display 12 are connected through a bus line 3. A spindle motor 13 is connected with the spindle control portion 10. With the spindle motor 13, a spindle 15, being free to rotate, drive and position with axial center CT provided parallel to Z-axis as its center is connected. With the spindle 15, a chuck 16 is provided. Claws 16a are provided with the chuck 16, being free to hold and release a workpiece 17 to be machined, being free to move and drive in the direction as shown by arrows C and D.

Tool rest driving motors 19 (the plural number) are connected with the tool rest control portion 11. A tool rest 20 is connected with the tool rest driving motor 19, being free to move and drive in the Z-axis direction and in the direction as shown by arrows E and F rectangular to the Z-axis, that is, in the X-axis direction by the tool rest driving motor 19. Furthermore, the tool rest 20 is provided, being free to move and drive in Y-axis direction rectangular to the X-axis and Z-axis, and rectangular to the paper, and in the direction as shown by arrows G and H which is B-axis direction with the Y-axis as its center by the tool rest driving motor 19.

A tool holding portion 20a is formed on the tool rest 20. A turning tool, a milling/drilling tool, and a complex tool 21 capable of turning and milling/drilling machining are provided with the tool holding portion 20a, being free to attach, detach and exchange. The tool holding portion 20a is provided, being free to fix and hold the complex tool and other tools in a predetermined holding state, and being free to rotate, drive and position around axial center CT2.

Figure 3:
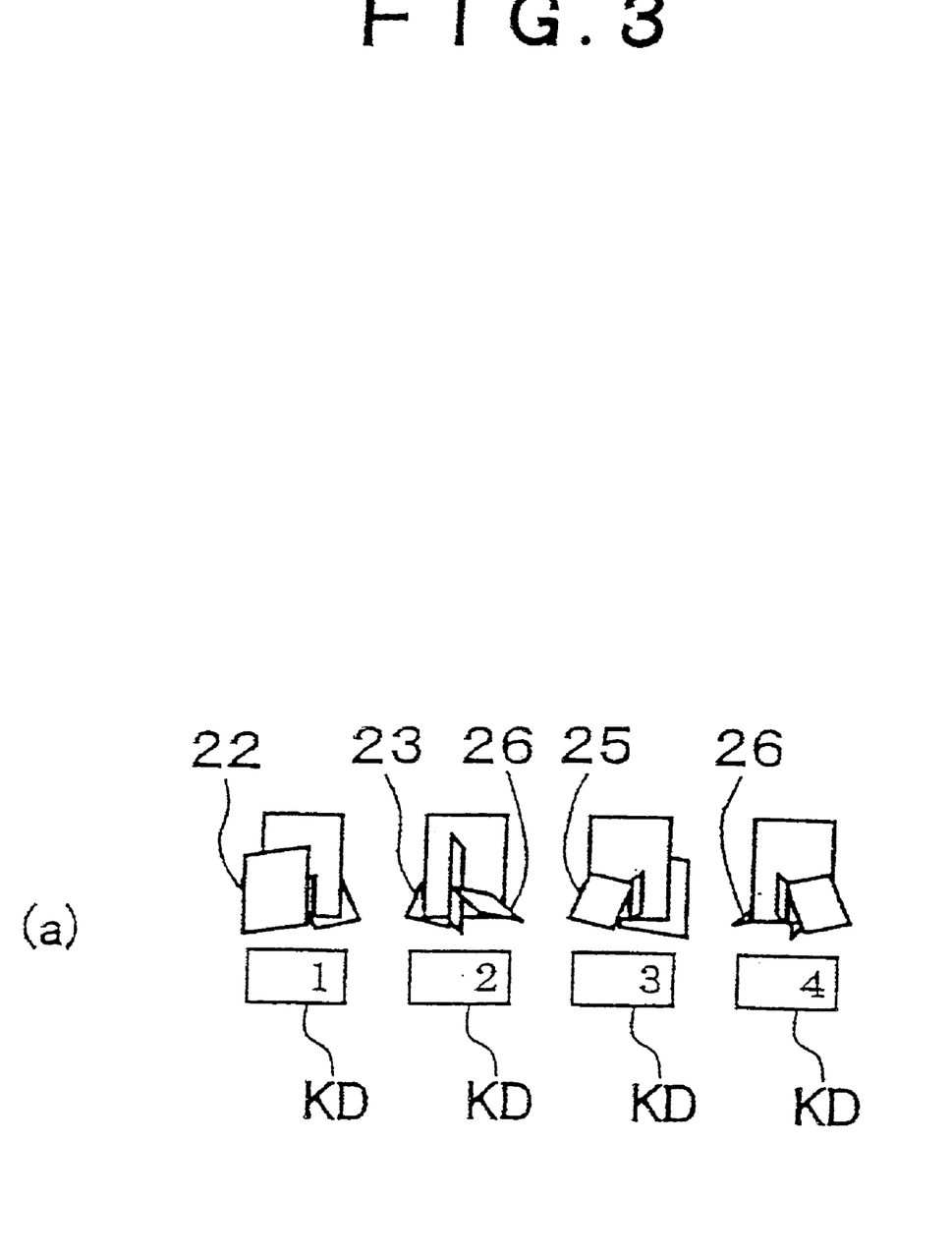
Figure 4:
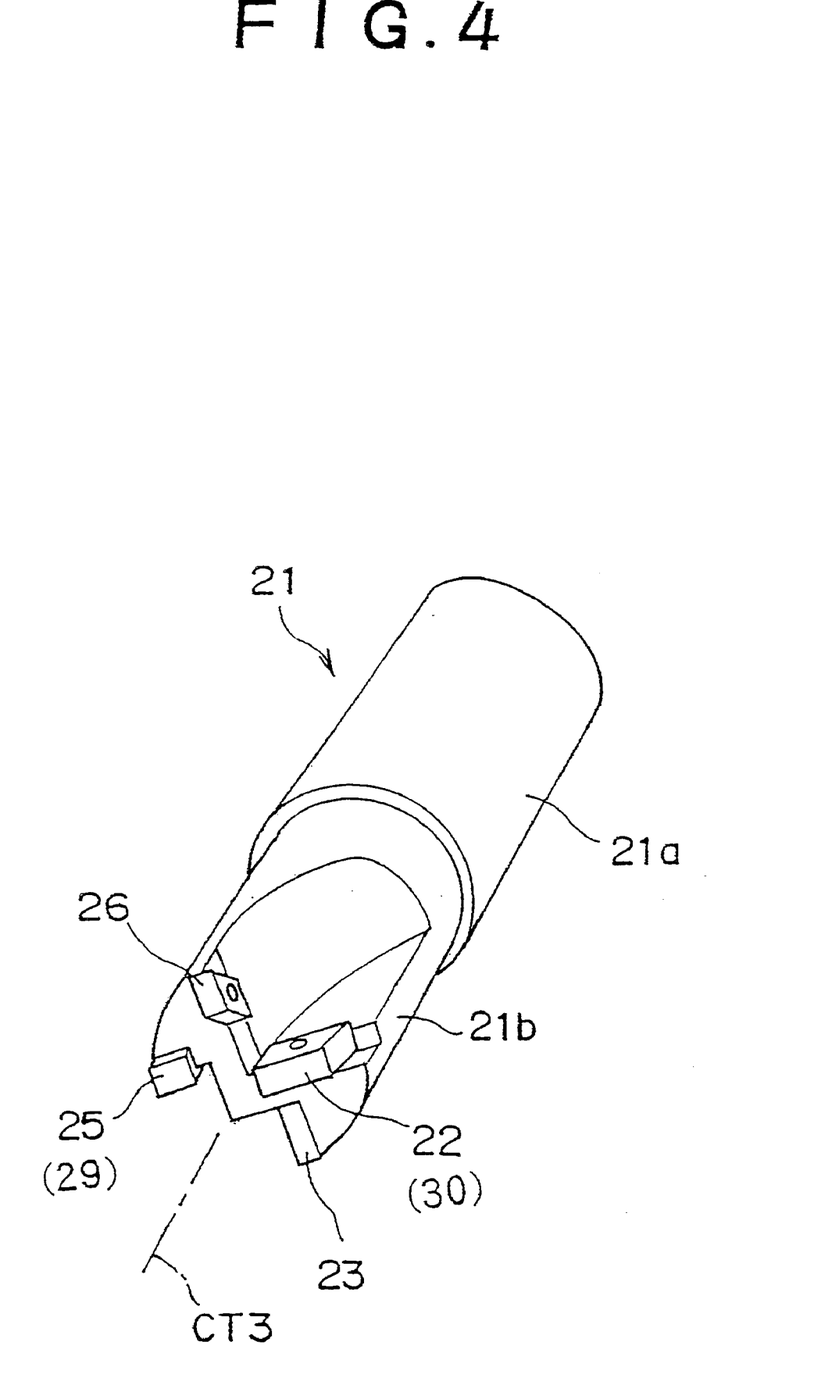
FIG. 4 is a view obliquely showing an example of a complex tool.

The complex tool 21 has a main body 21a formed in round bar shape, as shown in FIG. 4. On the top of the main body 21a, an insert installation portion 21b is formed. Four inserts 22, 23, 25 and 26 are respectively installed on the insert installation portion 21b at the pitch of 90° with axial center CT3 of the main body 21a as its center so as to attach and detach. As shown in FIG. 3(a), indexing number KD is set for each insert. The indexing number KD is set as 1 for the insert 22, and clockwise, the indexing number KD is 2 for the insert 23, the indexing number KD is 3 for the insert 25 and the indexing number KD is 4 for the insert 26.

Tool name is allotted to the respective inserts 22, 23, 25 and 26 as a virtual tool according to the machining contents to be performed with the complex tool 21. For the insert 22 which indexing number KD is 1, three kinds of tool name, ① turning drill for performing drilling machining wherein tool itself does not rotate, ⑥ milling drill for performing drilling machining wherein tool itself rotates and ⑦ end mill for performing milling machining (So-called "milling machining" in the present specification usually includes fraise machining to be used as the same meaning as milling machining.) is allotted as a virtual tool, as shown in FIG. 3(c). For the insert 23 which indexing number KD is 2, tool name NA, ④ inside diameter rough machining for performing turning rough machining on inside diameter is allotted, for the insert 25 which indexing number KD is 3, tool name NA, ② outside diameter rough machining for performing turning rough machining on outside diameter is allotted, and for the insert 26 which indexing number KD is 4, tool name NA, ③ outside diameter finishing for performing turning finishing machining on outside diameter and ⑤ inside diameter finishing for performing turning finishing machining on inside diameter is allotted as a virtual tool.

Figure 2:
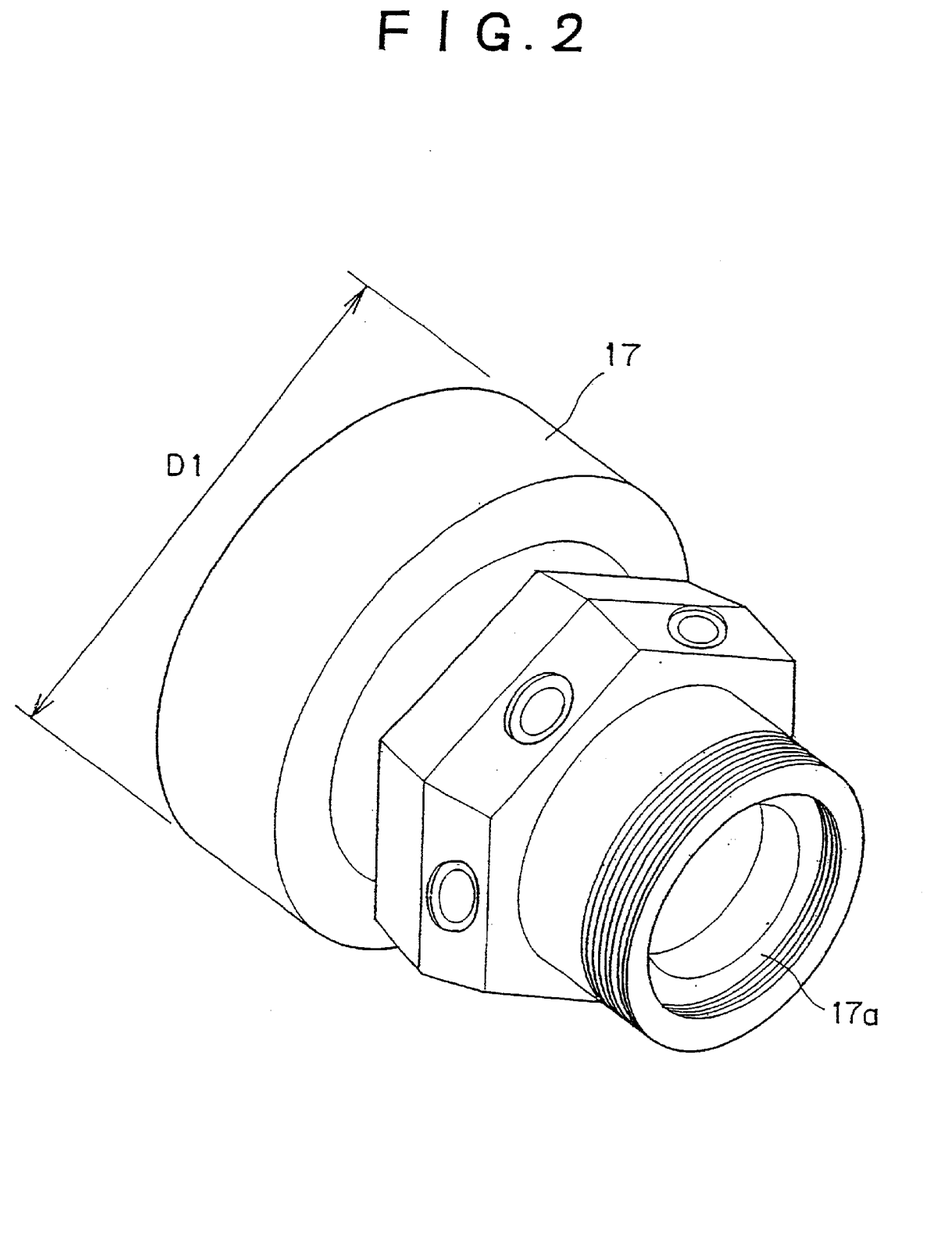
FIG. 2 is a view obliquely showing an example of a workpiece to be machined.

The complex machining machine tool 1 has the before-mentioned structure. Then, in order to machine the cylindrical workpiece 17 which diameter is D1, for instance, as shown in FIG. 2, an operator inputs various kinds of machining data by a known automatic programming method, operating the keyboard 5 so as to compose machining program. On this occasion, the main control portion 2 composes the machining program PRO on the basis of the various kinds of data input by an operator according to a known automatic program composing program stored in the system program memory 6, then the composed machining program PRO is stored in the machining program memory 9.

After the machining program PRO concerning the workpiece 17 is composed, an operator instructs the main control portion 2 to machine the workpiece 17 through the keyboard 5. Receiving this instruction, the main control portion 2 reads out the machining program PRO concerning the workpiece 17 from the machining program memory 9 so as to execute machining, appropriately driving the spindle control portion 10 and the tool rest control portion 11.

Figure 5:
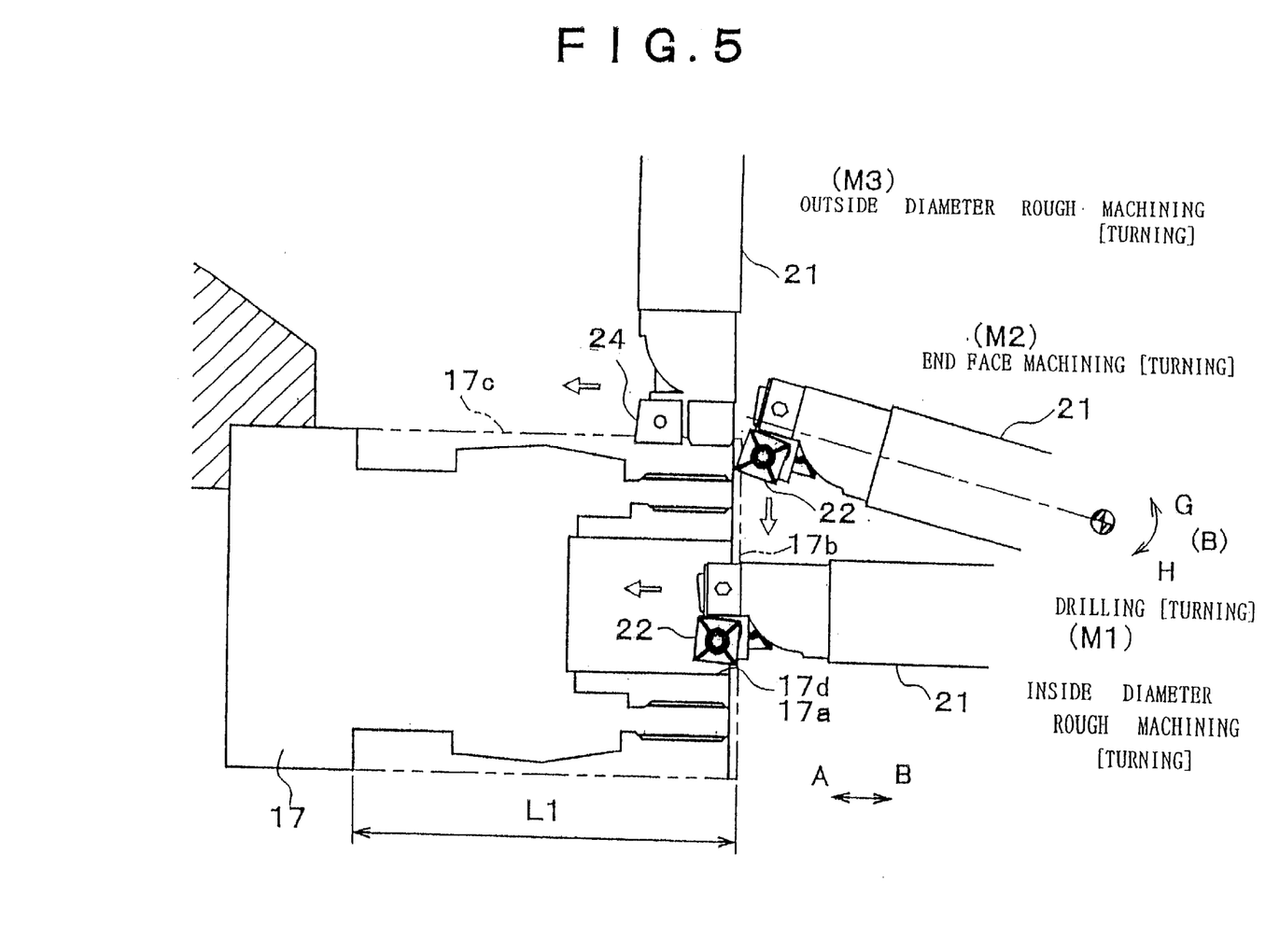
FIGS. 5, 6, 7, and 8 are views showing details when the workpiece as shown in FIG. 2 is machined with the complex tool.

As shown in (M1) of FIG. 5, at the machining on the workpiece 17, the machining for forming a hole 17a on the central portion of the workpiece 17 by drilling is firstly performed. The tool to be used at this time is designated by the machining program PRO. The main control portion 2 refers to the tool file 7 when the tool to be used is designated by the machining program PRO, and reads out tool data TL of the corresponding tool.

In the tool file 7, tool number TN, tool setting direction DR, tool name NA, nominal diameter/tool angle CA, suffix DC, rotational direction/tool character RT, tool diameter/tool edge R DM, finishing machining/rough machining division RF of the tool data DAT is set for each tool as chart data DAT1, as shown in FIG. 3(b). Furthermore, detailed data concerning each tool is stored as detailed data DAT2.

The complex tool 21 is set as an independent tool in this tool file 7, dividing into a plurality of virtual tools according to the machining contents capable of machining with the complex tool 21. For instance, seven virtual tools, on which the tool name NA and the suffix DC from ① to ⑦ mentioned before are affixed, are stored as the tool number TN 1 (the example of FIG. 3(b) is one example, and if the machining form with the complex tool 21 extends over many kinds, the virtual tools having many of tool name NA and suffix DC according to the machining kind are registered). That is, every machining contents allotted to the respective inserts 22, 23, 25, 26 of the complex tool 21, the tool data of the inserts 22, 23, 25, 26 for performing the machining contents is stored in the tool file 7, regarding the respective inserts as an independent tool. For instance, the virtual tools ① through ⑦ corresponding to each virtual tool name NA as shown in FIG. 3(c) are stored, corresponding to ① through ⑦ in FIG. 3(b).

That is, the virtual tool of ① turning drill of FIG. 3(c) is registered in such a manner that tool number TNo is 1, tool setting direction is ←, tool name NA is DRL EDG, nominal diameter/tool angle CA is 180, suffix DC is A, rotational direction/tool character RT is right rotation, and tool diameter/tool edge R DM is 50, as shown in ① of FIG. 3(b). On this occasion, tool setting direction DR shows the tool direction as default value by the direction of an arrow, "←" shows the direction wherein the direction of the tool is parallel to the Z-axis, that is, the B-axis angle is 0° and "↓"

shows the direction wherein the direction of the tool is parallel to the X-axis, that is, the B-axis angle is 90°.

The virtual tool of ② outside diameter rough machining of FIG. 3(c) is registered in such a manner that tool number TNo is 1, tool setting direction DR is ↓, tool name NA is GNL OUT, nominal diameter/tool angle CA is 75, suffix DC is B, rotational direction/tool character RT is left hand/right rotation, tool diameter/tool edge R DM is 0.4, finishing machining/rough machining division RF is R (rough machining), as shown in ② of FIG. 3(b). The virtual tool of ③ outside diameter finishing machining of FIG. 3(c) is registered in such a manner that tool number TNo is 1, tool setting direction DR is ↓, tool name NA is GNL OUT, nominal diameter/tool angle CA is 40, suffix DC is C, rotational direction/tool character RT is right hand/left rotation, tool diameter/tool edge R DM is 0.2, finishing machining/rough machining division RF is F (finishing machining), as shown in ③ of FIG. 3(b).

Furthermore, the virtual tool of ④ inside diameter rough machining of FIG. 3(c) is registered in such a manner that tool number TNo is 1, tool setting direction DR is ←, tool name NA is GNL IN, nominal diameter/tool angle CA is 75, suffix DC is D, rotational direction/tool character RT is right hand/left rotation, tool diameter/tool edge R DM is 0.4, finishing machining/rough machining division RF is R (rough machining), as shown in ④ of FIG. 3(b). The virtual tool of ⑤ inside diameter finishing machining of FIG. 3(c) is registered in such a manner that tool number TNo is 1, tool setting direction DR is ←, tool name NA is GNL IN, nominal diameter/tool angle CA is 40, suffix DC is E, rotational direction/tool character RT is right hand/left rotation, tool diameter/tool edge R DM is 0.2, finishing machining/rough machining division RF is F (rough machining), as shown in ⑤ of FIG. 3(b).

The virtual tool of ⑥ mill drill of FIG. 3(c) is registered in such a manner that tool number TNo is 1, tool setting direction DR is ↓, tool name NA is drill, nominal diameter/tool angle CA is 50, suffix DC is H, rotational direction/tool character RT is left direction, as shown in ⑥ of FIG. 3(b). The virtual tool of ⑦ end mill of FIG. 3(c) is registered in such a manner that tool number TNo is 1, tool setting direction DR is ↓, tool name NA is end mill, nominal diameter/tool angle CA is 50, suffix DC is J, rotational direction/tool character RT is right direction and tool diameter/tool edge R DM is 50, as shown in ⑦ of FIG. 3(b).

Then, in the machining program PRO, as the tool to be used in the machining program PRO, the tool name NA and the suffix DC of the corresponding virtual tool are designated, regardless of use of the complex tool 21 in the machining, similar to the case of designating a normal tool even if the complex 21 is used. In case of the machining (M1) for forming the hole 17a on the central portion of the workpiece 17 as shown in FIG. 5 as mentioned before, the virtual tool of ① turning drill of the complex tool 21 is used as a tool. So, in this designation, the tool name NA "DRL EDG" and the suffix DC "A" are input in the machining program PRO, similar to a normal tool designation. By doing so, the tool designation finishes only by acknowledging and designating each virtual tool in the tool file 7 by an operator without understanding the whole complex tool 21 at the time of composing the machining program PRO. Then, the composing of the machining program PRO is possible with no specific knowledge concerning the complex tool 21. Then, the main control portion 2 searches the tool data DAT of the tool file 7 so as to select the corresponding tool, that is, the virtual tool wherein the tool number TNo as shown in ① of FIG. 3(b) is 1 and tool name NA is "DRL EDG" and suffix DC is "A" as shown on the most upper hand of the figure, and instructs the tool rest control portion 11 to index the tool at the machining position. In the tool file 7, the respective tools (including ① through ⑦ as "virtual tool" regarded seven independent tools of the complex tool 21) are differentiated by tool name NA and suffix DC concerning turning machining related tool (in case of the same tool name NA, it is differentiated by changing suffix DC into "A", "B", "C", "D" and "E"), and are differentiated by tool name NA and nominal diameter/tool angle CA concerning the milling machining related tool, regardless of being the complex tool 21 or not. Then, when tool name NA and suffix DC or tool name NA and nominal diameter/tool angle CA are designated in the machining program PRO, the corresponding tool is immediately determined.

The tool rest control portion 11 drives the tool exchanger which is not shown, and selects the complex tool 21 which tool number TNo is 1 from the tool magazine which is not shown so as to install on the tool rest 20. When the complex tool 21 is installed on the tool rest 20, the tool rest control portion 11 refers to the detailed data DAT2 corresponding to ① turning drill from tool name NA and suffix DC designated in the machining program PRO, and reads out the indexing number KD concerning ① turning drill and the B-axis angle of the complex tool 21 shown in the detailed data DAT2.

The tool rest control portion 11 drives and controls a tool driving motor (not shown) built in the tool rest on the basis of the read indexing number KD and the B-axis angle concerning ① turning drill so as to rotate the complex tool 21 around the axial center CT3. Then, the complex tool 21 is positioned so as to be in the state that indexing number KD is 1 and is fixedly held in such a state. As shown in FIG. 3(a), the state that the indexing number is 1 is one that the insert 22 is positioned, facing the upper hand in the figure (the Y-axis direction). Furthermore, the B-axis driving motor which is not shown is driven, and the tool rest 20 is moved and driven in the direction as shown by the arrows G and H, and the complex tool 21 is positioned so as to be such a state that the B-axis angular position is 0°, and it is parallel to the Z-axis, as shown in FIG. 3(c). In this state, the spindle 15 is rotated and driven at a predetermined rotational number by the spindle driving motor 13, and the complex tool 21 is moved and driven in the arrow A direction of the Z-axis direction so as to form the hole 17a having a predetermined depth on the rotating workpiece 17 by the insert 22 of the complex tool 21 fixedly held on the tool rest 20, as shown in FIG. 5(M1). On this occasion, drilling machining may be performed by simultaneously using the insert 25 on the opposite side together with the insert 21.

Subsequently, an end face 17b of FIG. 5(M2) is machined by the insert 22 of the complex tool 21. In this case, the tool rest control portion 11 drives the B-axis driving motor with such a state that the tool of ① turning drill is selected so as to rotate and drive the tool rest 20 a predetermined angle in the direction as shown by the arrow H of the B-axis. As shown in FIG. 5 (M2), the complex tool 21 is held in slightly inclined state with respect to the Z-axis, and the end face 17b of the workpiece is machined by the same insert 22.

Next, rough machining is performed on an outside diameter 17c of the workpiece 17 of FIG. 5(M3) by the complex tool 21. In this case, in the machining program PRO, the virtual tool is designated, inputting "GNL OUT" as tool name NA and "B" as suffix DC. Then, the main control portion 2 searches the tool data DAT of the tool file 7, and selects the corresponding tool, that is, the virtual tool which tool name NA is "GNL OUT" and suffix DC is "B", which tool number is 1 shown on the second from the upper of the figure as shown in ② of FIG. 3(b), and instructs the tool rest control portion 11 to index the tool to the machining position.

The tool rest control portion 11 refers to the detailed data DAT2 corresponding to ② outside diameter rough machining from tool name NA and suffix DC designated in the machining program PRO and reads out the indexing number "3" and the B-axis angle "112°" concerning ② outside diameter rough machining of the complex tool 21 as shown in the detailed data DAT2.

The tool rest control portion 11 drives and controls the tool driving motor (not shown) built in the tool rest on the basis of the read indexing number "3" and the B-axis angle "112°" concerning ② outside diameter rough machining so as to rotate the complex tool 21 around the axial center CT3. Then, the complex tool 21 is positioned so as to become to be such a state that indexing number KD is 3 as shown in FIG. 3(a). Furthermore, the B-axis driving motor which is not shown is driven so as to move and drive the tool rest 20 in the direction as shown by the arrows G and H of the B-axis direction. Then, the complex tool 21 is positioned so as to become to be such a state that the B-axis angular position is 112° anticlockwise with respect to the Z-axis as shown in FIG. 5(M3). In this state, as shown in FIG. 5(M3), the complex tool 21 is moved and driven in the direction as shown by the arrow A of the Z-axis direction so as to machine the outside diameter 17c of the rotating workpiece 17 the predetermined length L1 by the insert 25.

Figure 6:
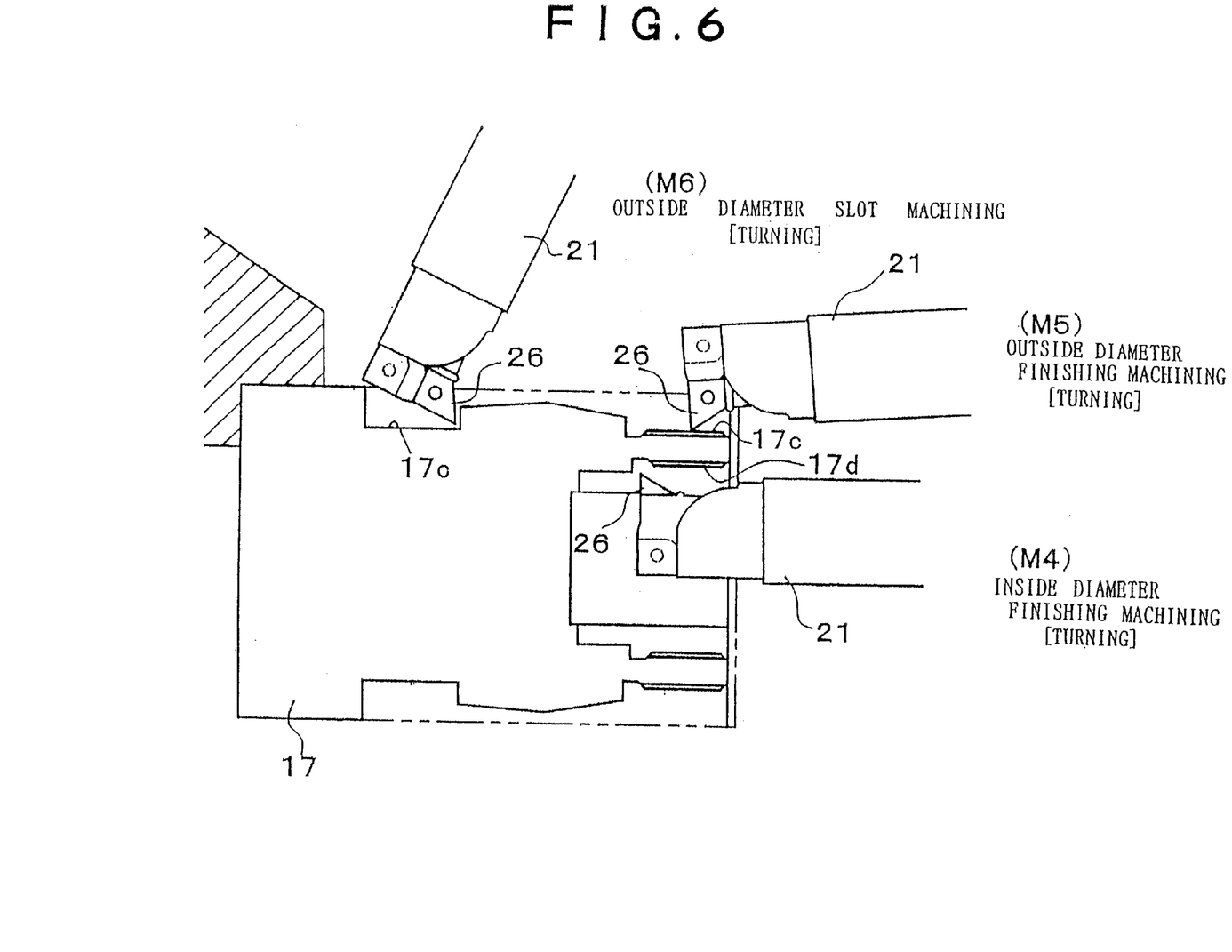

Next, finishing machining is performed on an inside diameter 17d of the workpiece 17 of FIG. 6(M4) by the complex tool 21. In this case, in the machining program PRO, the virtual tool is designated, inputting "GNL IN" as tool name NA and "E" as suffix DC. Then, the main control portion 2 searches the tool data DAT of the tool file 7, and selects the corresponding tool, that is, the virtual tool which tool name NA is "GNL IN" and suffix DC is "E", which tool number is 1 as shown on the fifth from the upper of the figure as shown in ⑤ of FIG. 3(b), and instructs the tool rest control portion 11 to index the tool to the machining position.

The tool rest control portion 11 refers to the detailed data DAT2 corresponding to ⑤ inside diameter finishing machining from tool name NA and suffix DC designated in the machining program PRO and reads out the indexing number "4" and the B-axis angle "0°" concerning ⑤ inside diameter finishing machining of the complex tool 21 as shown in the detailed data DAT2.

The tool rest control portion 11 drives and controls the tool driving motor (not shown) built in the tool rest on the basis of the read indexing number "4" and the B-axis angle "0" concerning ⑤ inside diameter finishing machining so as to rotate the complex tool 21 around the axial center CT3. Then, the complex tool 21 is positioned so as to become to be such a state that the indexing number KD is 4 as shown in FIG. 3(a). Furthermore, the B-axis driving motor which is not shown is driven so as to move and drive the tool rest 20 in the direction as shown by the arrows G and H of the B-axis direction. Then, the complex tool 21 is positioned such that the B-axis angular position is 0° with respect to the Z-axis, that is, so as to be parallel, as shown in FIG. 6(M4) In this state, as shown in FIG. 6(M4), the complex tool 21 is moved and driven in the direction as shown by the arrow A of the Z-axis direction so as to machine the inside diameter 17d of the rotating workpiece 17 the predetermined length by the insert 26.

Figure 7:
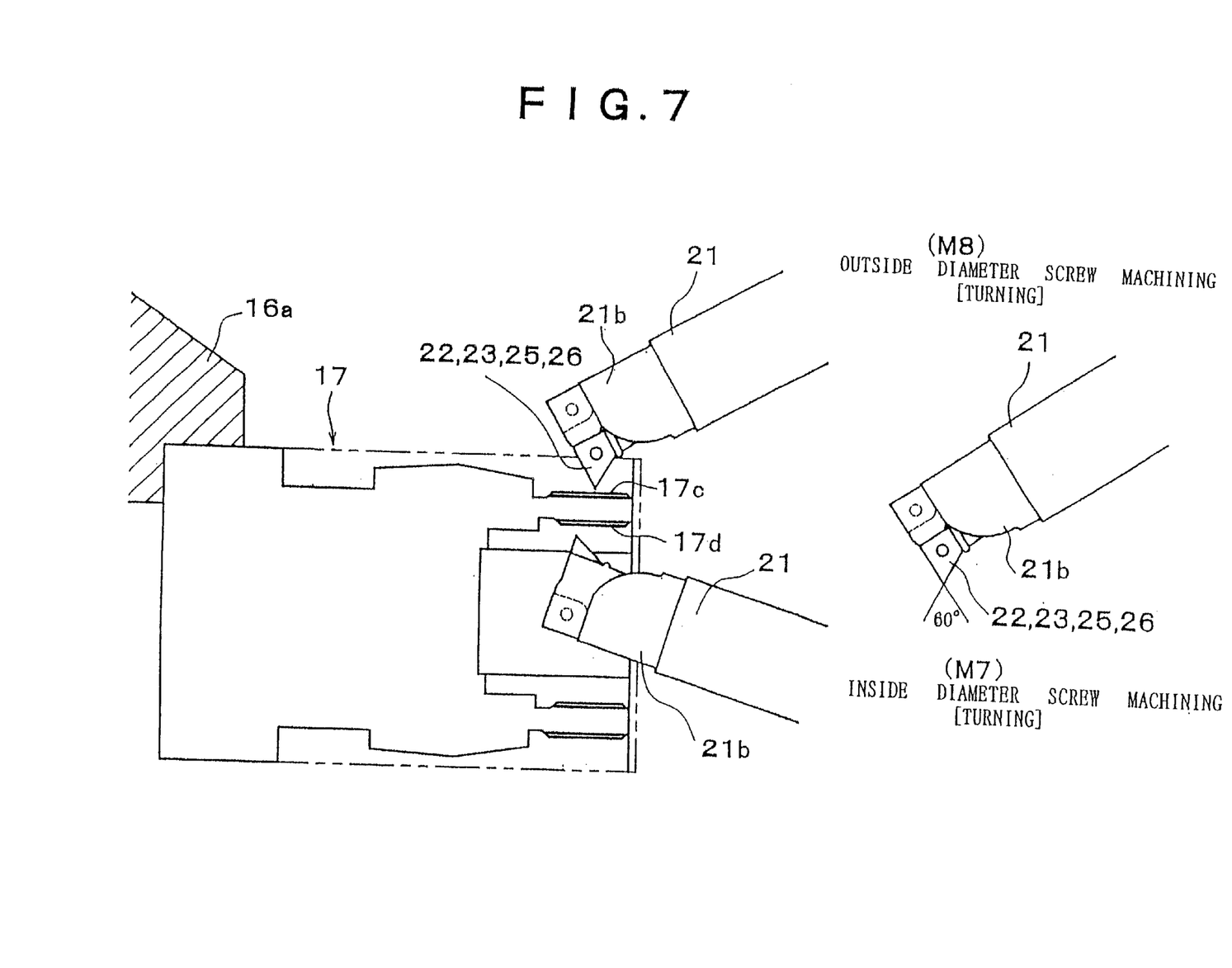

In this way, as shown in (M5), (M6) of FIG. 6 and (M7), (M8) of FIG. 7, the respective inserts 22, 23, 25, 26 of the same complex tool 21 are rotated around the tool axial center CT3 on the basis of the tool data DAT stored in the tool file 7 so as to selectively index and position the insert to be used for machining. And, the tool rest is properly rotated and positioned in the B-axis angular direction so as to perform various kinds of machining, such as the outside diameter finishing machining as shown in (M5) of FIG. 6, the outside diameter slot machining as shown in (M6) of FIG. 6, the inside diameter screw machining as shown in (M7) of FIG. 7, and the outside diameter screw machining as shown in (M8) of FIG. 7, on the workpiece 17 by the respective inserts 22, 23, 25 and 26. On this occasion, the virtual tools ① through ⑦ as shown in FIG. 3(c) are not used in a part of the machining concerning FIGS. 6 and 7. But, in this case also, the machining is performed using the virtual tools concerning the complex tool 21 of FIG. 4 set and stored in another part of the tool file 7. For instance, the virtual tool to be used for outside diameter finishing machining of FIG. 6 (M5) is one which tool number TN is 1 (showing the complex tool 21), tool name NA is "GNL OUT", suffix DC is "K", indexing number KD is "2" and B-axis angle is "5°" in the tool file 7, and this is the machining with the insert 26.

Figure 8:
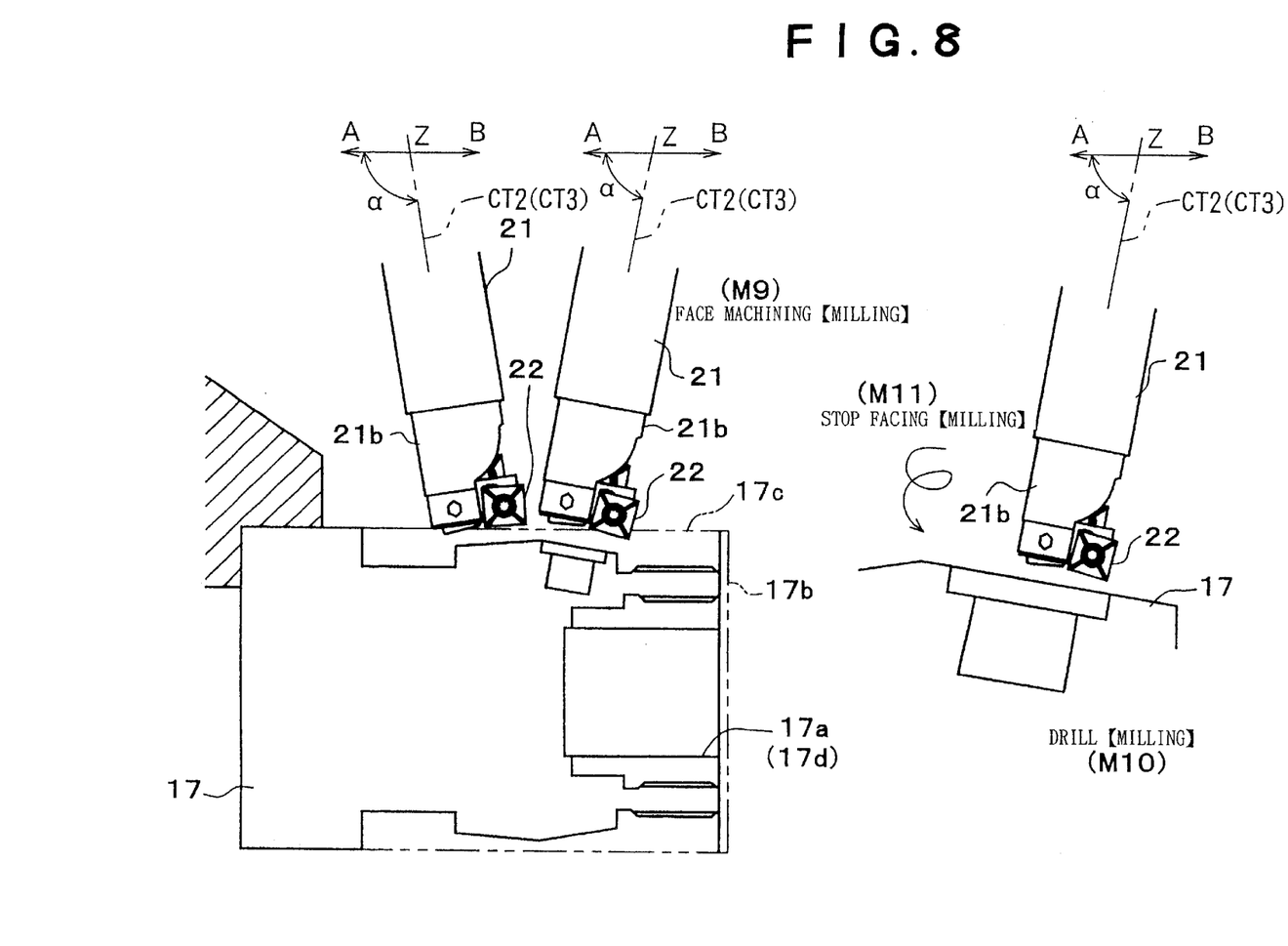

When the turning machining on the workpiece 17 finishes in this way, the milling machining as shown in FIG. 8(M9) (M10) and (M11) is performed at this time. In this case also, (M9) face machining, (M10) drilling machining and (M11) spot facing machining is performed on the workpiece 17 using ⑥ milling drill and ⑦ end mill of the virtual tools concerning the complex tool 21 set in the tool file 7 of the complex tool 21. Both ⑥ Milling drill and ⑦ end mill of the virtual tools are the milling machining by the insert 22 which indexing number is 1, as shown in FIG. 3(c). In this case, the tool rest 20 is rotated in the direction as shown by the arrows G and H according to the contents of machining so as to change the B-axis angle, and the position of the axial center CT3 of the complex tool 21 is changed and is positioned, changing the inclined angle a with respect to the Z-axis, that is, the center of the workpiece 17. Then, the milling machining is performed in such a manner that the workpiece 17 held by the spindle is fixedly held around the Z-axis or is rotated with C-axis control, rotating the complex tool 21 at a high speed with the axial center CT2 as its center.

On this occasion, the insert 25 positioning opposite 180° to the insert 22 to be used for milling machining with the axial center CT3 of the tool as its center in FIG. 4, of the inserts installed on the complex tool 21, is made the form and the installation mode similar to the insert 22, so that the insert 25 can be also used for milling machining in addition to the insert 22, as shown in FIG. 10(b). In this case, the number of the inserts to be used for machining on the workpiece becomes to be twice in comparison with the case of only insert 22. Then, milling/fraise machining can be effectively executed.

By machining as mentioned before, the cutting machining can be performed on the workpiece as shown in FIG. 2, for instance, from a round bar with one complex tool 21.

On this occasion, various kinds of inserts can be installed on the complex tool 21 according to the contents of machining since a plurality of numbers of inserts can be installed on the complex tool 21. With each insert, turning machining or milling/fraise machining is performed. At this time, milling/fraise machining can be of course performed simultaneously using the plural numbers of inserts in addition to the machining referring to FIG. 6 or so, selectively using one insert of the plurality of inserts of the complex tool 21.

Figure 10:
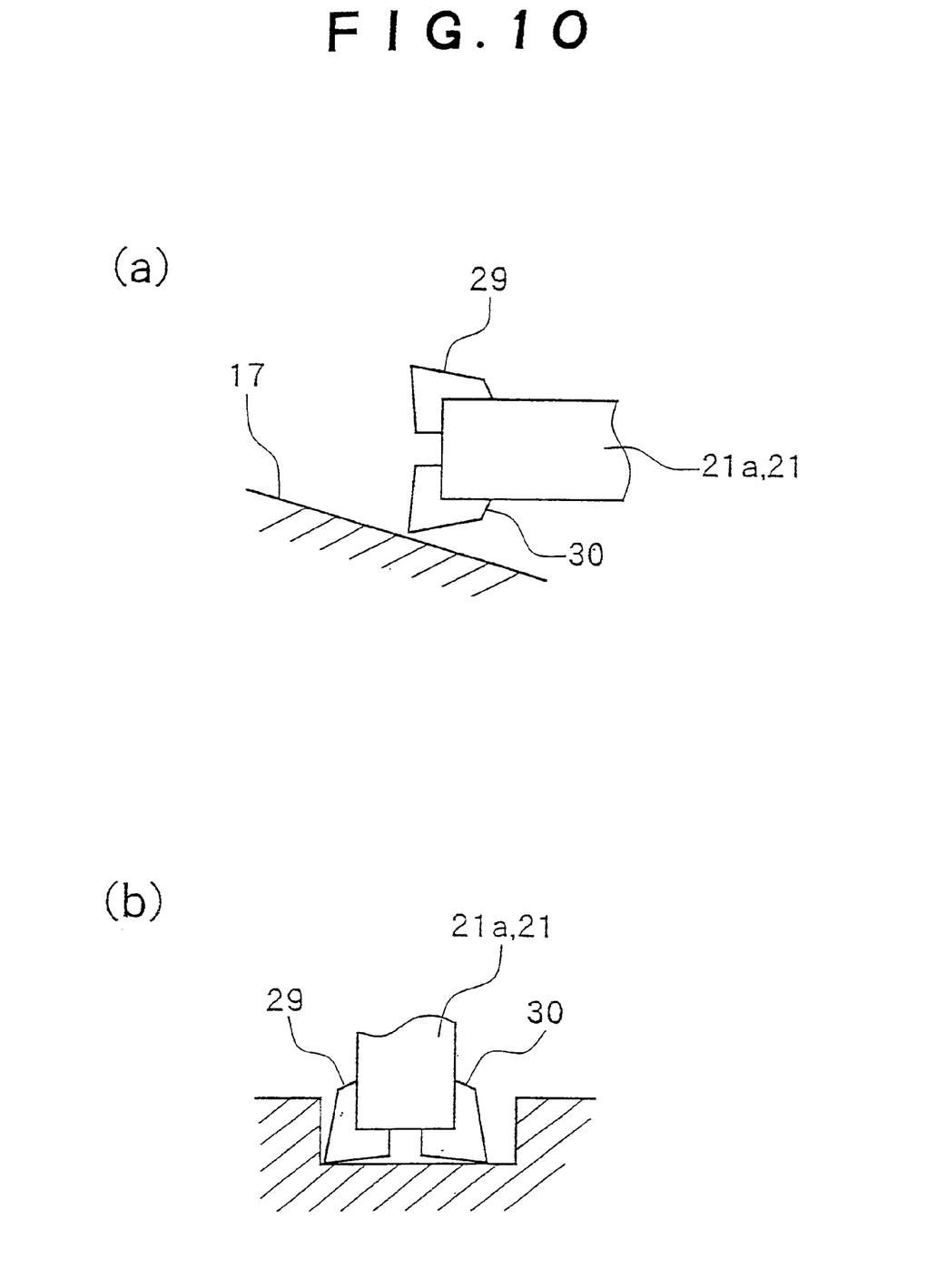

When machining is performed on the outer periphery of the workpiece 17, the machining to be considered are the turning machining on the outer periphery of the workpiece 17 with the insert 30 for instance, of the four inserts as shown in FIG. 10(*a*) for instance (The number of the inserts capable of installing on the complex tool 21 is not limited to four, but the complex tool 21 having four inserts provided at 90° pitch , similar to FIG. 4, will now be explained for simple explanation. Only two inserts 29, 30 located having phase difference of 180°, are shown in FIG. 10.), and milling/fraise machining on the workpiece simultaneously using the inserts 29, 30 as shown in FIG. 10(*b*).

Furthermore, milling/fraise machining as shown in FIG. 10(*b*) is of course possible with three or more inserts by properly selecting the form of the insert to be installed on the complex tool 21 and the mode of attaching this insert on the main body 21*a*, and drilling machining rotating the complex tool 21 is of course possible.

As mentioned before, various machining is always performed using one or more inserts in the complex tool 21. So, the tool data control portion 8 controls lifetime of each complex tool 21 as mentioned hereinafter.

Figure 9:
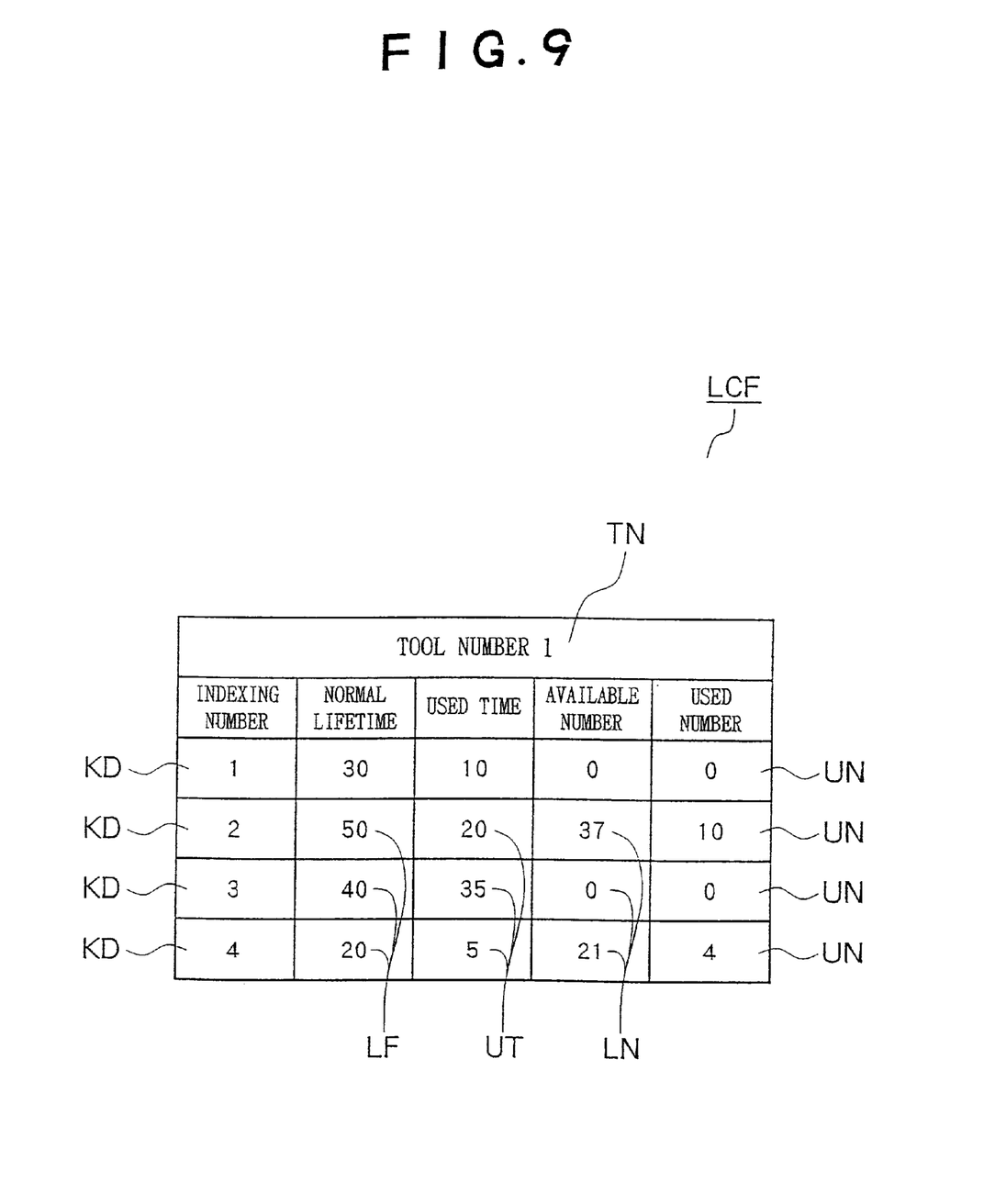
FIG. 9 is a typical view for showing an example of lifetime control file.

That is, the tool data control portion 8 stores lifetime control file LCF concerning each complex tool 21 in the tool file 7 for every insert, together with the tool data TL as shown in FIG. 3 or as a part thereof, as shown in FIG. 9.

In the lifetime control file LCF, indexing number KD in the complex tool 21 is adopted as the identification number corresponding to the insert installed on the complex tool 21 every tool number TN of each complex tool 21. In the example of FIG. 9, the four inserts 22, 23, 25, 26 are installed on the complex tool 21 of FIG. 4 for instance at the pitch of 90°, and in order to show these installation positions, four indexing numbers are clockwise allotted with the axial center CT3 of the tool as its center, as shown in FIG. 3(*a*). Therefore, the respective inserts 22, 23, 25, 26 and the indexing number KD can be corresponded with one to one. In place of the indexing number KD, some marks for identifying the respective inserts can be also of course used.

In the lifetime control file LCF, normal lifetime LF of each insert is set in advance as lifetime, corresponding to the indexing number KD which is the identification mark of each insert. This normal lifetime LF may be input in advance through the keyboard 5 by an operator at the time of machining start, or may be online written in the lifetime control file LCF from a tool preset room separately provided from the complex machining machine tool 1. When the machining to be performed by the complex tool 21 from now on is the machining for producing many of the same workpieces, the number of the workpieces capable of machining with the insert can be set in the shape of available number LN as the lifetime of the complex tool 21 in place of the normal lifetime LF. In this case, the machining time element to be integrated for judgement of lifetime is not used time UT of the insert, but the number of the workpieces machined. The value of this available number LN is obtained by dividing the time T1 into the normal lifetime LF of the insert and cutting off its remainder if the machining time of one workpiece is T1. Then, the lifetime of the insert is within the normal lifetime LF although the predetermined number of workpieces are machined, and the number of the workpieces machined by the insert, that is, used number UN reaches the available number LN, so the workpiece is not machined by the insert exhausted.

When the tool data control portion 8 simulates the machining program to be executed from now on and judges that the machining using only one insert of the complex tool 21 will be performed predetermined time T1 as shown in FIG. 10(*a*), for instance, the predetermined time T1 is added to the used time UT of the insert, which is stored in the address of the indexing number KD where the insert to be used for machining is installed in the lifetime control file LCF, corresponding to the tool number TN of the complex tool 21 although the machining is turning machining, milling/fraise machining or drilling machining. For instance, in case of the machining of FIG. 10(*a*), the predetermined time T2 is added to the used time UT corresponding to the address which indexing number KD is 1, corresponding to the insert 30.

When the used time UT of the insert exceeds the normal lifetime LF set on the insert, the tool data control portion 8 notifies an operator that the insert of the complex tool 21 reaches expiration of lifetime during the machining by giving alarm, and instructs to use spare tool or exchange the insert. Then, an operator knows before machining on the workpiece that at least one of the inserts of the complex tool 21 reaches expiration of lifetime in fact before reaching expiration of lifetime during the machining on the workpiece. Therefore, it is not necessary to interrupt the machining after the complex tool 21 reaches expiration of lifetime during the machining on the workpiece and to perform complex and inefficient operation, such as exchange of tool.

In case where the lifetime of the insert is controlled by machining number, the tool data control portion 8 integrates one of the used number UN of the address of the indexing number KD corresponding to the insert of the lifetime control file LCF every time one workpiece is machined by the insert corresponding to the complex tool 21. When the used number UN reaches the available number LN, the tool data control portion 8 notifies an operator of the expiration of the lifetime of the insert of the complex tool 21, similar to the above-mentioned, and instructs to use a spare tool or to exchange the insert. In this case, the lifetime of the insert is controlled by the machining number. So, even if the used number UN becomes to be equal to the available number LN, the lifetime of the insert is maintained within the lifetime, as mentioned above.

When the tool data control portion 8 simulates the machining program to be executed from now on and judges that the machining simultaneously using two or more inserts 29, 30 of the complex tool 21 will be performed predetermined time TI as shown in FIG. 10(*b*), for instance, the predetermined time TI is respectively added to the used times UT of these inserts, which are stored in the addresses of the indexing numbers KD where the inserts to be used for machining are installed (for instance, the indexing numbers KD are 1 and 3) in the lifetime control file LCF, corresponding to the tool number TN of the complex tool 21 although the machining is milling/fraise machining or drilling machining. For instance, in case of the machining of FIG. 10(*b*), the predetermined time TI is respectively added to the used times UT corresponding to the addresses which indexing numbers KD are 1 and 3, corresponding to the inserts 29, 30 to be used at the same time.

When the used time UT of any insert of these inserts exceeds the normal lifetime LF set on the insert in advance, the tool data control portion 8 judges that the complex tool 21 reaches the expiration of the lifetime and notifies an operator that one or more inserts of the complex tool 21 reach expiration of lifetime during the machining by giving alarm, and instructs to use spare tool in place of the complex tool 21 or exchange the insert expected to be expiration of lifetime. Then, an operator knows before machining on the workpiece that at least one of the inserts of the complex tool 21 reaches expiration of lifetime in fact before reaching expiration of lifetime during the machining on the workpiece. Therefore, it is not necessary to interrupt the machining after the complex tool 21 reaches expiration of lifetime during the machining on the workpiece and to perform complex and inefficient operation, such as exchange of tool.

In case where machining is executed simultaneously using a plurality of inserts, the lifetime of each insert is integrated, respectively adding machining time to the used times UT of the inserts to be used for the machining. Therefore, the lifetime of every insert, comprising the complex tool 21, can be correctly controlled, regardless of the machining contents to be executed by the complex tool 21.

When lifetime is controlled by machining number in case where the machining using a plurality of inserts is executed, the used numbers UN of the indexing numbers KD corresponding to the inserts to be used with the complex tool 21 are respectively added by its machining number, and expiration of the lifetime of the complex tool 21 is judged when the added used number UN of one of the inserts of the complex tool 21 firstly reaches the available number LN, similar to the above-mentioned.

When the tool data control portion 8 judges that at least one of the inserts installed on a complex tool 21 reaches expiration of the lifetime, the complex tool 21 which lifetime reaches its expiration is exchanged into a spare complex tool 21, and the machining is continued.

Besides, the complex tool 21 which lifetime reaches its expiration is transferred to a tool preset room or the like, and the insert which reaches expiration of the lifetime is exchanged into a new one and is used again for machining. Therefore, a plurality of inserts installed on the complex tool 21 is effectively used for machining till each insert reaches expiration of the lifetime. Then, such situation that the expiration of the lifetime of the complex tool is judged and all of the inserts installed on the complex tool 21 is thrown away although some inserts does not already reach the expiration of the lifetime is avoided.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A method of machining workpieces using a complex tool having a plurality of inserts thereon, installed on a tool holding means of a machine tool, said method comprising:
   selectively using at least one of the inserts of said plurality of said inserts installed on said complex tool so as to perform a turning machining operation on a rotating workpiece, with said complex tool being fixed and held; and selectively using at least one of the inserts of said plurality of said inserts installed on said complex tool so as to perform a milling machining operation on said workpiece, with said complex tool being rotated and driven.

2. The method of machining workpieces as set forth in claim 1, wherein said turning machining and milling machining operations are executed without attaching and detaching said complex tool on and from said tool holding means of said machine tool.

3. The method of machining workpieces as set forth in claim 1, wherein said milling machining operation is executed using at least two of the inserts of the plurality of said inserts installed on said complex tool, simultaneously.

4. The method of machining workpieces as set forth in claim 1, wherein at least one of said inserts used in at least one of said turning machining and milling machining operations is attachably and detachably installed on a main body of said complex tool.

5. The method of machining workpieces as set forth in claim 1, wherein said complex tool is positioned with respect to a workpiece, further comprising changing a position of said complex tool with respect to said workpiece, and executing a predetermined machining operation in a plurality of positions on said workpiece, without attaching and detaching said complex tool on and from said tool holding means.

6. The method of machining workpieces as set forth in claim 3, wherein said at least two of said inserts to be used simultaneously for said milling machining operation comprise ones of the inserts installed on positions having phase shift of 180° with respect to each other.

7. The method of machining workpieces as set forth in claim 1, comprising preparing a plurality of said complex tools and selectively installing these complex tools on said tool holding means so as to machine the workpiece with said plurality of said complex tools.

8. The method of machining workpieces as set forth in claim 1, wherein at least one of said inserts installed on said complex tool is used for both the turning machining operation and the milling machining operation.

* * * * *